(12) United States Patent
Ando

(10) Patent No.: US 11,370,032 B2
(45) Date of Patent: Jun. 28, 2022

(54) CUTTING TOOL AND METHOD FOR MANUFACTURING MACHINED PRODUCT

(71) Applicant: KYOCERA Corporation, Kyoto (JP)

(72) Inventor: Yuichi Ando, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 136 days.

(21) Appl. No.: 16/652,853

(22) PCT Filed: Oct. 2, 2018

(86) PCT No.: PCT/JP2018/036880
§ 371 (c)(1),
(2) Date: Apr. 1, 2020

(87) PCT Pub. No.: WO2019/069924
PCT Pub. Date: Apr. 11, 2019

(65) Prior Publication Data
US 2020/0230704 A1    Jul. 23, 2020

(30) Foreign Application Priority Data
Oct. 6, 2017   (JP) .............................. JP2017-195605

(51) Int. Cl.
*B23B 27/10*     (2006.01)
*B23C 5/28*      (2006.01)
(Continued)

(52) U.S. Cl.
CPC ............ *B23B 27/10* (2013.01); *B23B 27/007* (2013.01); *B23B 2200/123* (2013.01); *B23Q 11/10* (2013.01)

(58) Field of Classification Search
CPC ................ B23Q 11/1046; B23Q 11/10; B23B 27/16663; B23B 27/16; B23B 2220/123;
(Continued)

(56) References Cited

U.S. PATENT DOCUMENTS 2,391,794 A * 12/1945 O'Brien, Jr. ...... B23B 29/03407
                                                    408/57
2,550,645 A *  4/1951 Retz ........................ B23B 27/10
                                                    407/11
(Continued)

FOREIGN PATENT DOCUMENTS

CN        203578869 U     5/2014
CN        203791646 U     8/2014
(Continued)

*Primary Examiner* — Sara Addisu
(74) *Attorney, Agent, or Firm* — Volpe Koenig

(57) ABSTRACT

A cutting tool may include a main body having a bar shape extended along a central axis. The main body may include a cutting edge, a first flow path, a second flow path, a third flow and a fourth flow path. The first flow path is located along the central axis and may include an inflow port. The second flow path is located along the central axis and may include a smaller inner diameter than the first flow path. The third flow path may connect to the first flow path and may include a first outflow port. The fourth flow path may connect to the second flow path and may include a second outflow port. The first outflow port is located more away from an imaginary plane including the central axis and the cutting edge than the second outflow port.

12 Claims, 20 Drawing Sheets

(51) Int. Cl.
  *B23Q 11/10* (2006.01)
  *B23B 27/00* (2006.01)
(58) Field of Classification Search
  CPC ... B23B 27/007; B23B 27/10; B23B 2250/12; Y10T 407/14; Y10T 407/25; Y10T 408/45; Y10T 408/455
  See application file for complete search history.

(56) References Cited

U.S. PATENT DOCUMENTS

| | | | | |
|---|---|---|---|---|
| 2,641,047 | A * | 6/1953 | Jackman | B23B 27/10 407/11 |
| 3,364,800 | A * | 1/1968 | Benjamin | B23Q 1/0036 408/239 R |
| 3,808,656 | A * | 5/1974 | Lindskog | B23B 27/10 407/11 |
| 3,874,808 | A * | 4/1975 | Zaccardelli | B23B 47/34 408/1 R |
| 4,072,438 | A * | 2/1978 | Powers | B23B 27/007 407/103 |
| 4,606,680 | A * | 8/1986 | Striegl | B23B 29/03421 408/147 |
| 4,695,208 | A * | 9/1987 | Yankoff | B23B 27/04 407/106 |
| 4,757,307 | A * | 7/1988 | Keramati | B23Q 11/10 340/680 |
| 4,838,136 | A * | 6/1989 | Kress | B23B 29/16 82/130 |
| 4,955,264 | A * | 9/1990 | Armbrust | B23B 25/02 407/11 |
| 5,358,360 | A * | 10/1994 | Mai | B23Q 11/1084 408/61 |
| 5,709,508 | A * | 1/1998 | Barazani | B23B 27/045 407/101 |
| 6,109,152 | A * | 8/2000 | Hecht | B23B 29/043 82/160 |
| 6,471,448 | B1 | 10/2002 | Lagerberg | |
| 7,785,046 | B2 * | 8/2010 | Beckington | B23B 31/1075 408/56 |
| 10,058,965 | B2 * | 8/2018 | Haimer | B23B 31/11 |
| 10,766,080 | B2 * | 9/2020 | Hughey | B23C 5/02 |
| 2007/0081867 | A1 * | 4/2007 | Murakami | B23B 27/10 407/11 |
| 2009/0311055 | A1 * | 12/2009 | Galota | B23C 5/28 407/11 |
| 2010/0178117 | A1 * | 7/2010 | Watanabe | B23B 27/007 407/11 |
| 2010/0196105 | A1 * | 8/2010 | Amstibovitsky | B23Q 11/1084 407/11 |
| 2010/0272529 | A1 * | 10/2010 | Rozzi | B23C 5/28 408/56 |
| 2012/0230780 | A1 * | 9/2012 | Henry | B23B 29/043 407/11 |
| 2013/0028669 | A1 * | 1/2013 | Cigni | B23C 5/10 407/11 |
| 2014/0356082 | A1 * | 12/2014 | Smith | B23B 27/10 407/11 |
| 2015/0290716 | A1 | 10/2015 | Herberth et al. | |
| 2015/0352640 | A1 * | 12/2015 | Frota De Souza Filho | B23B 27/10 407/11 |
| 2016/0175938 | A1 * | 6/2016 | Kaufmann | B33Y 80/00 407/11 |
| 2016/0236281 | A1 * | 8/2016 | Kitagawa | B23B 27/10 |
| 2018/0133809 | A1 * | 5/2018 | Brunner | B23B 51/06 |
| 2018/0318935 | A1 * | 11/2018 | Kobayashi | B23B 29/043 |
| 2019/0009344 | A1 * | 1/2019 | Poy | B23B 27/10 |
| 2019/0030613 | A1 * | 1/2019 | Larsson | B23B 27/10 |
| 2019/0240738 | A1 * | 8/2019 | Nagae | B23B 27/10 |
| 2019/0366444 | A1 * | 12/2019 | Henzler | B23B 27/1677 |
| 2020/0038962 | A1 * | 2/2020 | Kobayashi | B23B 27/04 |
| 2021/0039173 | A1 * | 2/2021 | Lof | B23B 27/10 |
| 2021/0220921 | A1 * | 7/2021 | Lu | B33Y 80/00 |
| 2021/0260668 | A1 * | 8/2021 | Henger | B23B 27/10 |

FOREIGN PATENT DOCUMENTS

| | | | |
|---|---|---|---|
| EP | 0791420 A1 * | 8/1997 | ........... B23Q 11/10 |
| JP | 04-051306 U | 4/1992 | |
| JP | 06-057503 U | 8/1994 | |
| JP | 2001-087906 A | 4/2001 | |
| JP | 2007-075933 A | 3/2007 | |
| JP | 2007-268695 A | 10/2007 | |
| JP | 2010-105084 A | 5/2010 | |
| JP | 2015-521549 A | 7/2015 | |
| JP | 2018202530 A * | 12/2018 | ........... B23B 29/043 |
| WO | WO-2005037472 A1 * | 4/2005 | ........... B23B 27/145 |
| WO | WO-2017110903 A1 * | 6/2017 | ........... B23B 27/10 |

* cited by examiner

US 11,370,032 B2

CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/036880, filed on Oct. 2, 2018, which claims priority to Japanese Application No. 2017-195605, filed on Oct. 6, 2017, which is entirely incorporated herein by reference.

TECHNICAL FIELD

The present disclose generally relates to cutting inserts for use in a cutting process, specifically cutting tools for use in inner diameter machining, and more specifically boring bites.

BACKGROUND

For example, a boring bite discussed in Japanese Unexamined Patent Publication No. 2007-75933 (Patent Document 1) and a cutting tool discussed in Japanese Unexamined Patent Publication No. 2001-87906 (Patent Document 2) have been known as a cutting tool used in carrying out a cutting process of an inner diameter of a workpiece, such as metal.

Patent Document 1 discusses the cutting tool in which an injection port of a coolant hole disposed in a shank may be inclined toward a cutting edge in a plan view. Patent Document 2 discusses the cutting tool including a first nozzle for spraying cooling fluid (coolant) toward an upper side surface of an insert, and a second nozzle for spraying the coolant toward chips.

SUMMARY

A cutting tool in a non-limiting embodiment may include a main body having a bar shape extended along a central axis from a first end to a second end. The main body may include a cutting edge, a first flow path, a second flow path, a third flow path and a fourth flow path. The cutting edge may be located so as to protrude sideward on a side of a first end of the main body. The first flow path may be located along the central axis and may include an inflow port. The second flow path may be located from the first flow path toward the first end along the central axis, and may include a smaller inner diameter than the first flow path. The third flow path may connect to the first flow path and may include a first outflow port. The fourth flow path may connect to the second flow path and may include a second outflow port. The first outflow port may be located more away from an imaginary plane including the central axis and the cutting edge than the second outflow port.

EMBODIMENTS

Figure 1:
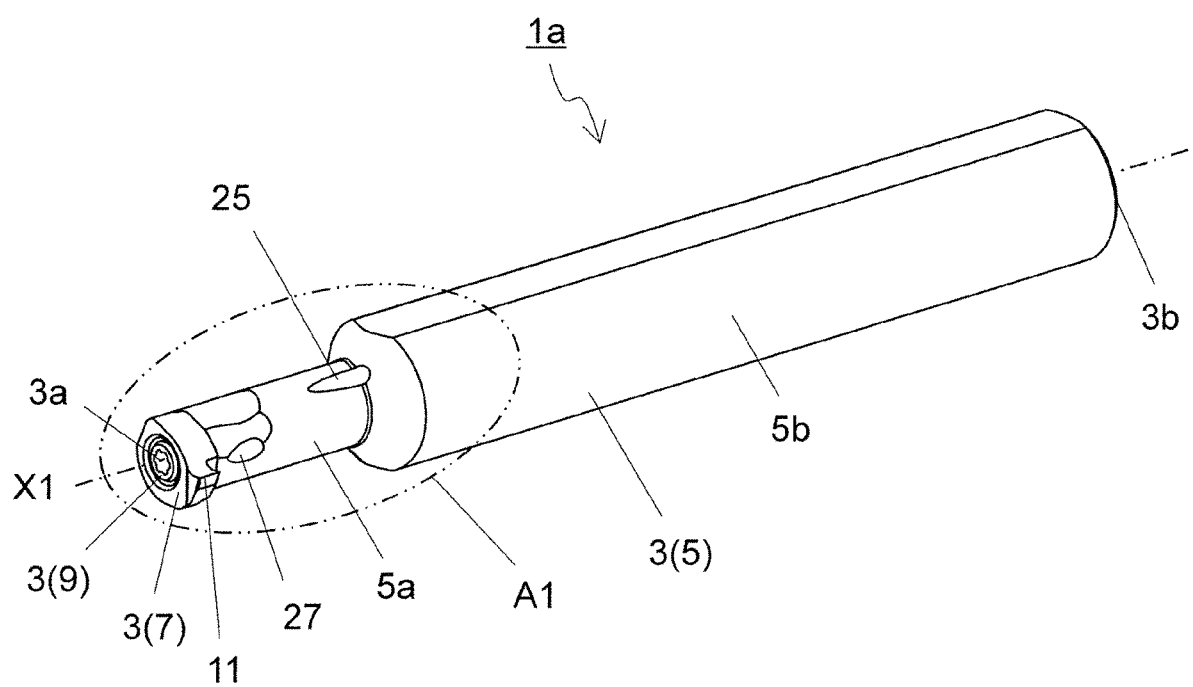
FIG. 1 is a perspective view illustrating a cutting tool in a non-limiting embodiment.

The cutting tool discussed in Patent Document 2 may be the tool used for carrying out a cutting process of an outer diameter of a workpiece. Therefore, the cutting tool discussed in Patent Document 2 may have a high degree of freedom in terms of position of outflow ports in the first and second nozzles and in terms of extending direction of the first and second nozzles.

The tool used in carrying out the cutting process of the inner diameter of the workpiece, such as the cutting tool discussed in Patent Document 1, may be used in a state of being inserted into a bore of the workpiece. Hence, the tool may have a low degree of freedom in terms of position of an outflow port of a coolant hole and in terms of extending direction of the coolant hole. It may be therefore difficult to suitably discharge chips and efficiently cool the cutting edge by using coolant.

Cutting tools in a plurality of non-limiting embodiments may be individually described below with reference to the drawings. For the sake of description, each of the drawings referred to in the following illustrates, in a simplified form, only main members necessary for describing non-limiting embodiments. The cutting tools may be therefore capable of including any structural member not illustrated in the drawings referred to. Dimensions of the members in each of the drawings may be ones which faithfully represent neither dimensions of actual structural members nor dimension ratios of these members.

<Cutting Tools>

As a cutting tool in a non-limiting embodiment, the cutting tool 1a for use in an internal grooving process may be illustrated and described below. The cutting tool 1a in a non-limiting embodiment illustrated in FIG. 1 may include a main body 3 having a bar shape which is extended from a first end 3a to a second end 3b along a central axis X1. In general, the first end 3a may be called "a front end" and the second end 3b may be called "a rear end." The main body 3 may be configured to extend from the first end 3a to the second end 3b, and may have, for example, a columnar shape or prism shape.

The main body 3 may be constituted by one or a plurality of members. The cutting tool 1a including the main body 3 constituted by the single member may be generally called "solid type." The main body 3 in a non-limiting embodiment illustrated in FIG. 1 may be constituted by the plurality of members. Specifically, the main body 3 in a non-limiting embodiment illustrated in FIG. 2 may include a holder 5, an insert 7 and a fixing member 9.

The holder 5 may have a bar shape extended from the first end 3a to the second end 3b along the central axis X1 as in a non-limiting embodiment illustrated in FIG. 1. An outer diameter of the holder 5 may be kept constant or changed. The holder 5 may be constituted by a small diameter part 5a and a large diameter part 5b in a non-limiting embodiment illustrated in FIG. 1. The small diameter part 5a may be located on a side of the first end 3a and may include a relatively small outer diameter. The large diameter part 5b may be located closer to a side of the second end 3b than the small diameter part 5a, and may include a relatively large outer diameter.

The insert 7 may be located on a side of the first end 3a in the holder 5. The insert 7 may be in contact with an end surface on the side of the first end 3a in the holder 5 in a non-limiting embodiment illustrated in FIG. 2.

For example, steel, cast iron, and aluminum alloy may be usable as a member constituting the holder 5. Dimensions of the holder 5 may be suitably set according to dimensions of a workpiece. A length of the holder 5 in a direction along the central axis X1 may be settable to, for example, approximately mm or more but 200 mm or less. A width thereof in a direction orthogonal to the central axis X1 may be settable to, for example, approximately 6 mm or more but 50 mm or less.

Figure 2:
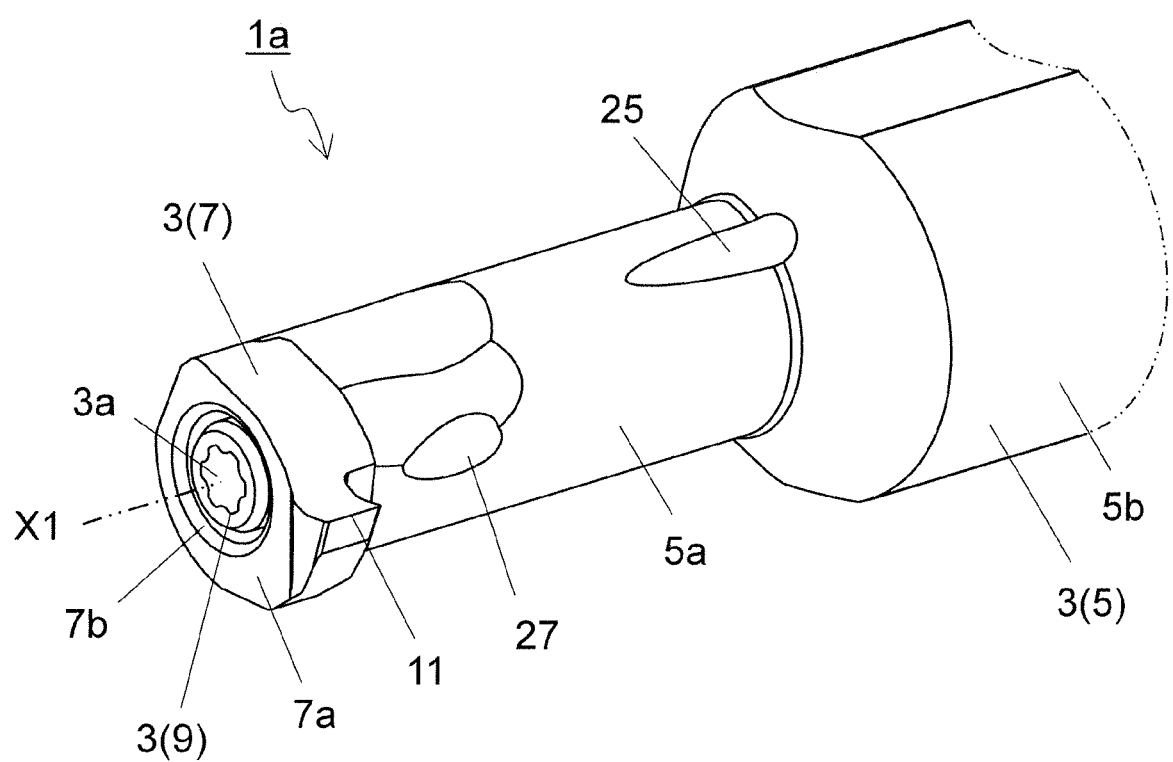
FIG. 2 is an enlarged view of a region A1 illustrated in FIG. 1.

An end surface 7a and a surface located on a side opposite to the end surface 7a in the insert 7 may have an approximately circular disc shape as in a non-limiting embodiment illustrated in FIG. 2. The insert 7 may include a through hole 7b that opens into the end surface 7a and the surface located on the side opposite to the end surface 7a as in a non-limiting embodiment illustrated in FIG. 2.

A shape of the insert 7 is not limited to a configuration illustrated in FIG. 2. For example, the end surface 7a and the surface located on the side opposite to the end surface 7a in the insert 7 may have a polygonal plate shape having an approximately polygonal shape. The insert 7 may have a bar shape extended in a direction orthogonal to the central axis X1 of the holder 5. The insert 7 having the bar shape may be called "dog bone type" in some cases.

For example, cemented carbide or cermet may be usable as a material of a member constituting the insert 7. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic component. Examples of the cermet may include ones which are composed mainly of a titanium compound, such as titanium carbide (TiC) or titanium nitride (TiN).

The fixing member 9 may be the member for fixing the insert 7 to the holder 5. The fixing member 9 may be a screw 9 in a non-limiting embodiment illustrated in FIG. 2. The fixing member 9 is not limited to the screw 9, but may be, for example, a clamp member. The insert 7 may include the through hole 7b as described above, and the holder 5 may include a screw hole (not illustrated) at a position corresponding to the through hole 7b in a non-limiting embodiment illustrated in FIG. 2.

The insert 7 may be fixable to the holder 5 by inserting the screw 9 into the through hole 7b of the insert 7, and by fixing the screw 9 to the screw hole of the holder 5. The through hole 7b and the screw hole may be extended in the direction along the central axis X1 in a non-limiting embodiment illustrated in FIG. 2.

The main body 3 may include a cutting edge 11 located so as to protrude sideward on a side of the first end 3a. A cutting process can be carried out by bringing the cutting edge 11 into contact with the workpiece. The cutting edge 11 may be located most away from the central axis X1 on the side of the first end 3a of the main body 3 in a non-limiting embodiment illustrated in FIG. 5. Because the cutting edge 11 is protruded sideward, it is possible to bring only a vicinity of the cutting edge 11 in the main body 3 into contact with the workpiece. The insert 7 in the main body 3 may include the cutting edge 11 in a non-limiting embodiment illustrated in FIG. 5.

The main body 3 may also include a flow path 13 located therein. The flow path 13 may be capable of serving as a portion that permits passage of coolant during use of the cutting tool 1a. The holder 5 in the main body 3 may include the flow path 13 in a non-limiting embodiment illustrated in FIG. 3.

Figure 3:
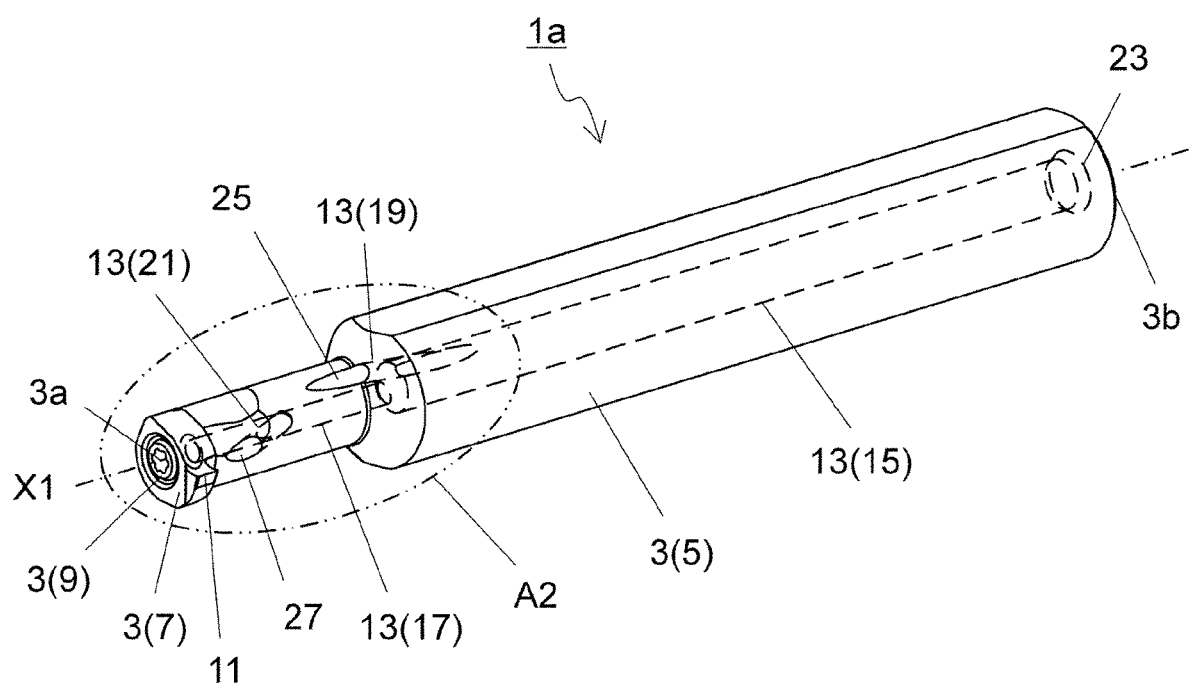
FIG. 3 is a perspective view of a flow path in the cutting tool illustrated in FIG. 1.

The flow path 13 may include a first flow path 15, a second flow path 17, a third flow path 19 and a fourth flow path 21 in a non-limiting embodiment illustrated in FIG. 3. The first flow path 15 may be located along the central axis X1 and may include an inflow port 23 for the coolant. The first flow path 15 may be located on the side of the second end 3b in the main body 3 and extended in a straight line shape along the central axis X1 in a non-limiting embodiment illustrated in FIG. 3.

The inflow port 23 for the coolant may be located on the end surface on the side of the second end 3b in the main body 3 in a non-limiting embodiment illustrated in FIG. 3. A position of the inflow port 23 for the coolant is not limited to the end surface, but may be located, for example, on an outer peripheral surface of the main body 3.

The second flow path 17 may be extended from the first flow path 15 toward the first end 3a and located along the central axis X1. The second flow path 17 may be located closer to the side of the first end 3a in the main body 3 than the first flow path 15, and may be extended in a straight line shape along the central axis X1 in a non-limiting embodiment illustrated in FIG. 4.

Figure 4:
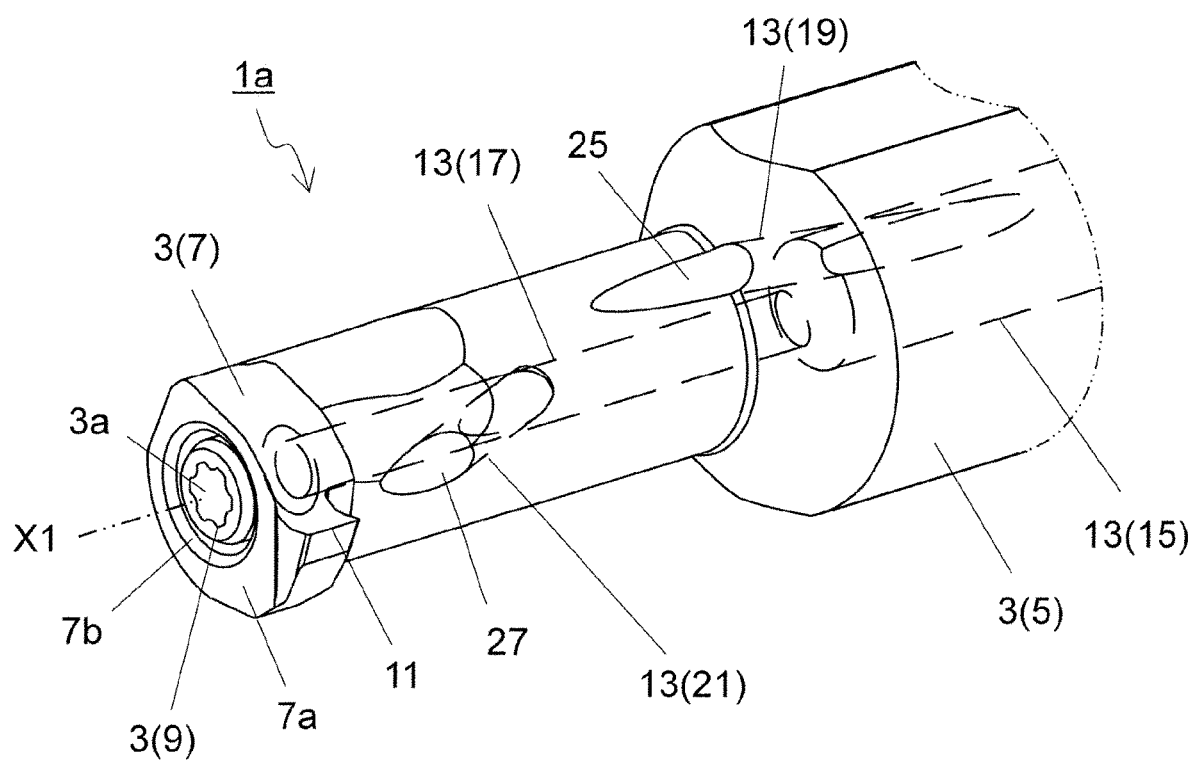
FIG. 4 is an enlarged view of a region A2 illustrated in FIG. 3.

An inner diameter of the second flow path 17 may be smaller than an inner diameter of the first flow path 15 in a non-limiting embodiment illustrated in FIG. 4. Thus, because the inner diameter of the second flow path 17 is smaller than the inner diameter of the first flow path 15, it is possible to enhance a fluid pressure of the coolant ejected from a first outflow port 25 and a second outflow port 27 described later.

The third flow path 19 may connect to the first flow path 15 and may include the first outflow port 25. The first outflow port 25 may be located on an outer peripheral surface of the main body 3 in a non-limiting embodiment illustrated in FIG. 4. The third flow path 19 may be extended in a straight line shape as in a non-limiting embodiment illustrated in FIG. 4. The first outflow port 25 may be capable of serving as a region for ejecting the coolant toward chips generated by the cutting edge 11.

In cases where the holder 5 is constituted by the small diameter part 5a and the large diameter part 5b as in a non-limiting embodiment illustrated in FIG. 2, the first outflow port 25 may be located so as to lie across the small diameter part 5a and the large diameter part 5b.

The fourth flow path 21 may connect to the second flow path and may include the second outflow port 27. The second outflow port 27 may be located on an outer peripheral surface of the main body 3 in a non-limiting embodiment illustrated in FIG. 4. The fourth flow path 21 may be extended in a straight line shape as in a non-limiting embodiment illustrated in FIG. 4. The second outflow port 27 may be capable of serving as a region for ejecting the coolant toward the chips generated by the cutting edge 11.

Figure 5:
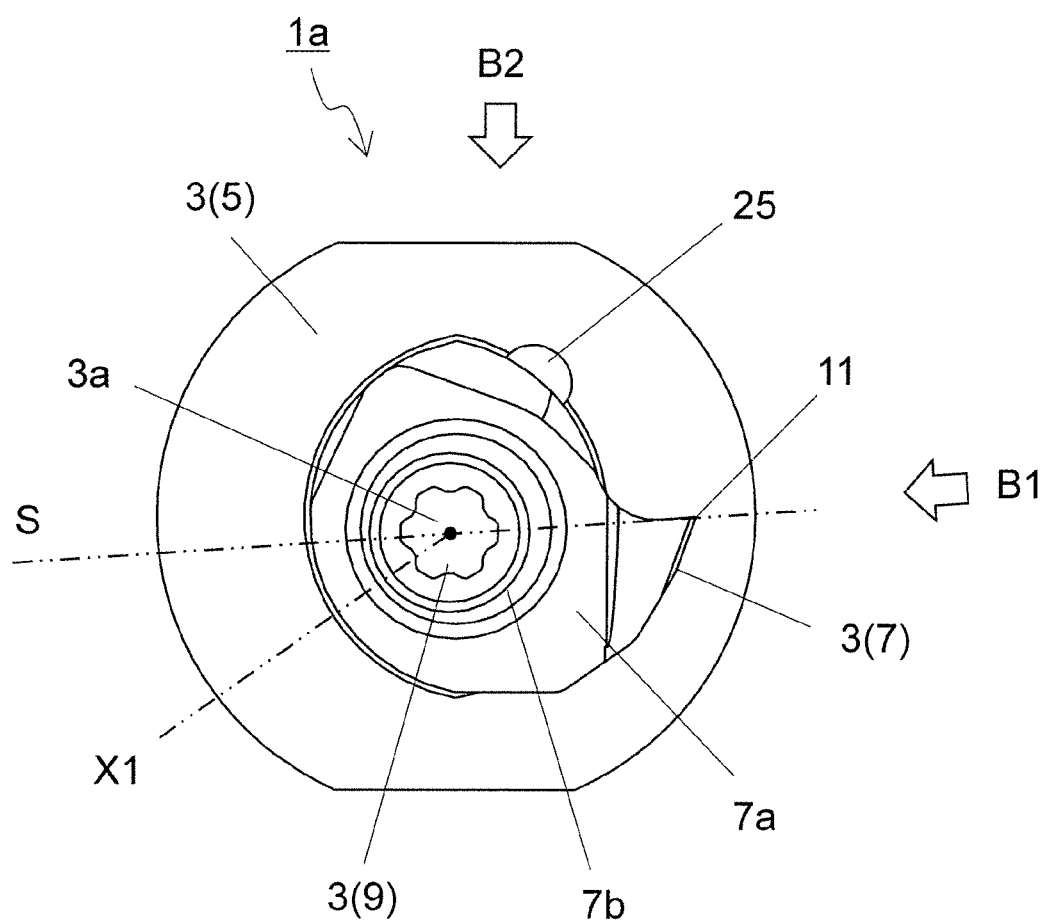
FIG. 5 is a front view of the cutting tool illustrated in FIG. 1 as viewed toward a first end.

The first outflow port 25 may be located more away from an imaginary plane S including the central axis X1 and the cutting edge 11 than the second outflow port 27. The imaginary plane S may denote the plane including the central axis X1 and the cutting edge 11 as illustrated in FIG. 5. The central axis X1 may be illustrated overlappedly with the imaginary plane S in a state in which the cutting edge 11 is overlapped with the central axis X1 as in FIGS. 7 and 8.

Because the first outflow port 25 and the second outflow port 27 have the above positional relationship, the chips can be discharged suitably, and the cutting edge 11 can be cooled efficiently. This may be because the coolant ejected from the first outflow port 25 is less likely to collide with the coolant ejected from the second outflow port 27 when ejecting the coolant from the first outflow port 25 toward the chips, and when ejecting the coolant from the second outflow port 27 toward the cutting edge 11.

In particular, if a part of the second outflow port 27 is included in the imaginary plane S, the coolant ejected from the first outflow port 25 may be much less likely to collide with the coolant ejected from the second outflow port 27.

Also, if the second outflow port 27 is located more away from the central axis X1 than the first outflow port 25 in a front view from a direction orthogonal to the imaginary plane S, the coolant ejected from the first outflow port 25 may be much less likely to collide with the coolant ejected from the second outflow port 27.

The coolant may be supplied from the inflow port 23 to the first flow path 15. The coolant supplied to the first flow path 15 may pass through the third flow path 19 and may be discharged from the first outflow port 25. The coolant supplied to the first flow path 15 may pass through the fourth flow path 21 and may be discharged from the second outflow port 27.

Alternatively, the coolant may be supplied not only from the inflow port 23 but also from a portion other than the inflow port 23. The coolant may be supplied not only from the first outflow port 25 and the second outflow port 27, but also from a portion other than these outflow ports.

The coolant may be composed of, for example, water-insoluble cutting fluid or water-soluble cutting fluid, and may be usable by being suitably selected according to a material of a workpiece. Examples of the water-insoluble cutting fluid may include oil-based cutting fluids, inert extreme pressure-based cutting fluids and active extreme pressure-based cutting fluids. Examples of the water-soluble cutting fluid may include emulsion-type, soluble-type and solution-type cutting fluids. Alternatively, the coolant may be gases, such as inert gas, instead of fluid ones.

A shape of the flow path 13 is not particularly limited as far as being capable of permitting passage of the coolant. The first flow path 15, the second flow path 17, the third flow path 19 and the fourth flow path 21 in a non-limiting embodiment may have a circular shape in terms of shape of a cross section orthogonal to a flow direction of the coolant. The shape of the flow path 13 in the cross section may be, for example, an elliptical shape or polygonal shape. An inner diameter of the flow path 13 may be, for example, 1 mm or more but 10 mm or less.

The flow path 13 can be formed by carrying out a hole drilling of a member that serves as the main body 3 with the use of a drill or the like. A part of a hole part obtained by the hole drilling, which does not serve as the flow path 13, may be closed by a seal member (not illustrated) in order to avoid leakage of the coolant. Examples of the seal member may include solder, resin members and screw members.

An inner diameter of the second flow path 17 may be smaller than an inner diameter of the first flow path 15 in the flow path 13 in a non-limiting embodiment illustrated in FIG. 3. This may make it easier to ensure that the first outflow port 25 of the third flow path 19 connecting to the first flow path 15 is located more away from the imaginary plane S including the central axis X1 and the cutting edge 11 than the second outflow port 27 of the fourth flow path 21 connecting to the second flow path 17. This may lead to a high degree of freedom in terms of extending direction of the third flow path 19 and the fourth flow path 21 and in terms of position of the first outflow port 25 and the second outflow port 27.

An inner diameter of the fourth flow path 21 may be smaller than the inner diameter of the second flow path 17 in a non-limiting embodiment illustrated in FIG. 3. An ejection pressure of the coolant ejected from the second outflow port 27 can be enhanced if the inner diameter of the fourth flow path 21 is smaller than the inner diameter of the second flow path 17.

Figure 8:
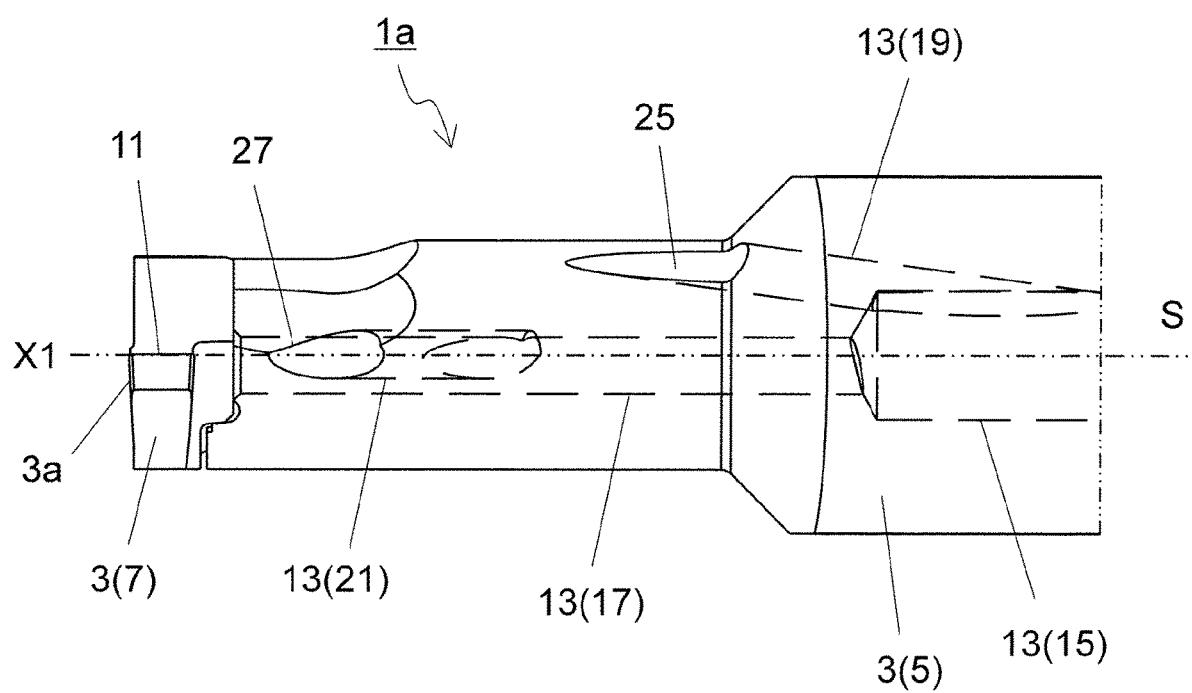
FIG. 8 is a perspective view of a flow path in the cutting tool illustrated in FIG. 7.
Figure 9:
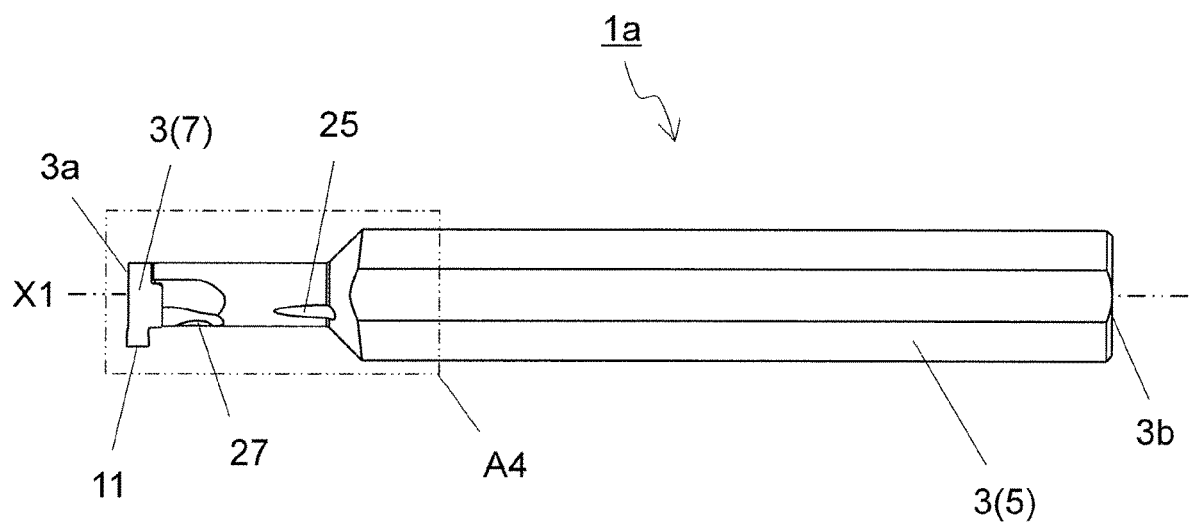
FIG. 9 is a side view of the cutting tool illustrated in FIG. 5 as viewed from a B2 direction.
Figure 10:
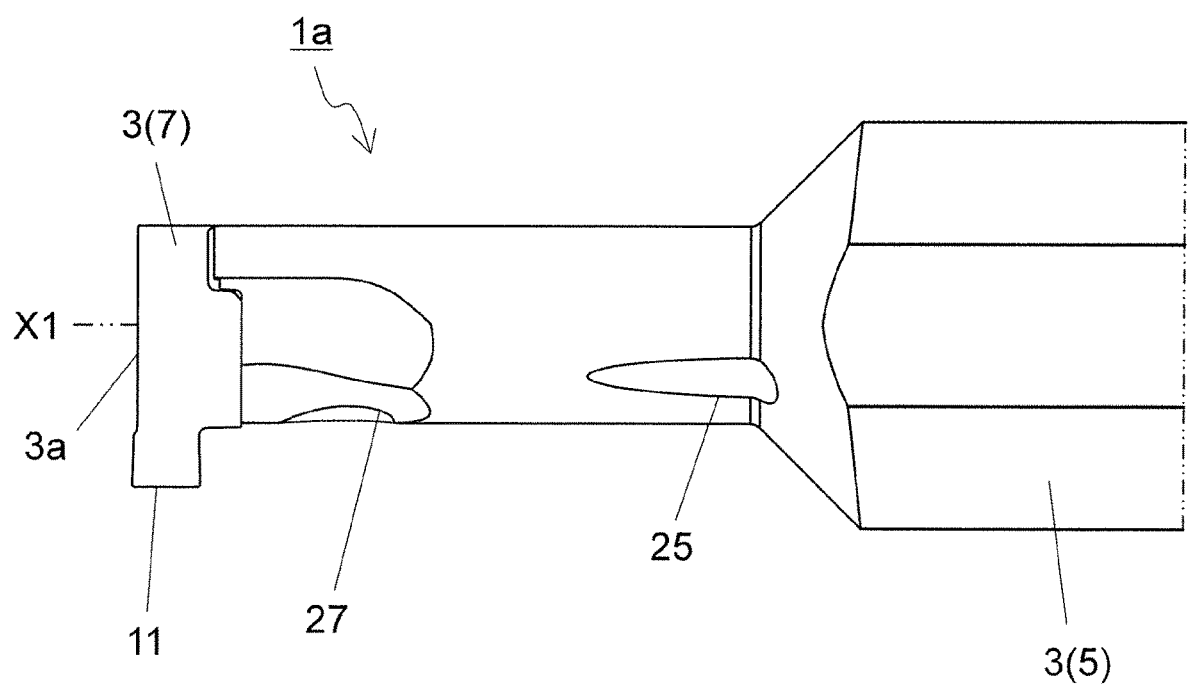
FIG. 10 is an enlarged view of a region A4 illustrated in FIG. 9.
Figure 11:
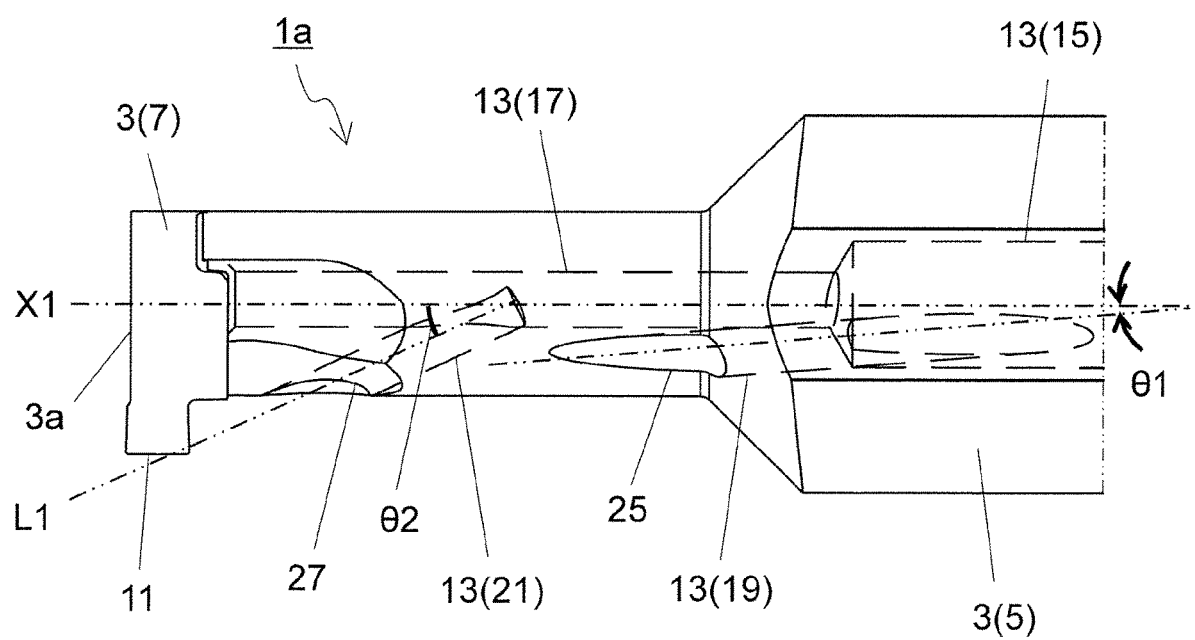
FIG. 11 is a perspective view of a flow path in the cutting tool illustrated in FIG. 10.

The second outflow port 27 may open toward the cutting edge in order to achieve an outflow of the coolant toward the cutting edge 11 in a non-limiting embodiment illustrated in FIGS. 8 and 11. Specifically, an imaginary extension line L1 of the fourth flow path 21 which extends in a straight line shape may intersect with the cutting edge 11. In cases where the imaginary extension line L1 of the fourth flow path 21 intersects with the cutting edge 11, it is possible to more efficiently cool the cutting edge 11.

Figure 7:
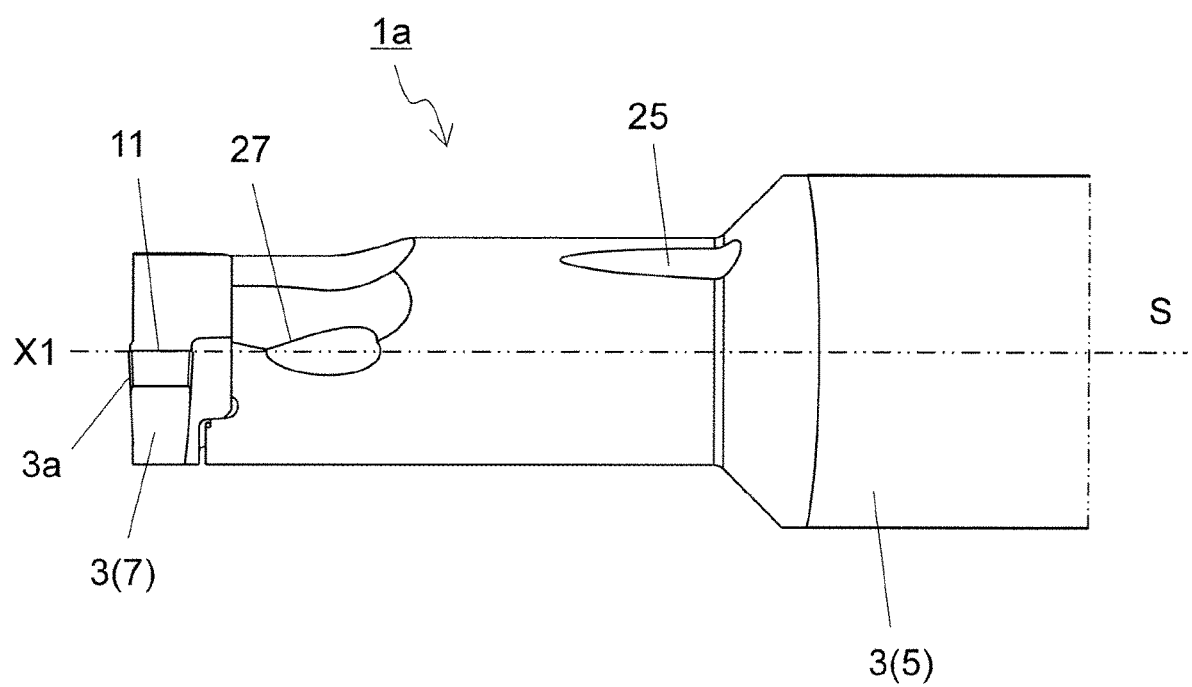
FIG. 7 is an enlarged view of a region A3 illustrated in FIG. 6.

The first outflow port 25 may open toward a position away from the cutting edge 11 on the imaginary plane S in order to achieve an outflow of the coolant toward the chips generated by the cutting edge 11 in a non-limiting embodiment illustrated in FIGS. 7 and 8. Specifically, the first outflow port 25 may open toward above the cutting edge 11 in a non-limiting embodiment illustrated in FIGS. 7 and 8.

In cases where the first outflow port 25 is so located, it is possible to stably apply the coolant ejected from the first outflow port 25 to the chips generated by the cutting edge 11 and extended toward above the cutting edge 11. This may lead to a better discharge of the chips.

Although the first outflow port 25 is located more away from the imaginary plane S than the second outflow port 27 in a non-limiting embodiment illustrated in FIGS. 7 and 8, the third flow path 19 may be located more away from the imaginary plane S than the fourth flow path 21. In cases where the third flow path 19 and the fourth flow path 21 have the above positional relationship, it is possible to ensure a higher degree of freedom in terms of extending direction of the third flow path 19 and the fourth flow path 21 and in terms of position of the first outflow port 25 and the second outflow port 27. This may lead to more efficient cooling of the cutting edge 11 and a better discharge of the chips.

The extending direction of the third flow path 19 is not limited to a specific direction. For example, the third flow path 19 may be extended so as to go away from the imaginary plane S as going away from the first flow path 15. The third flow path 19 may be extended upward so as to go away from the imaginary plane S as going away from the first flow path 15 in a non-limiting embodiment illustrated in FIG. 8.

The coolant passing through the third flow path 19 may be ejected from the first outflow port 25 toward the chips generated by the cutting edge 11. In cases where the third flow path 19 is extended so as to go away from the imaginary plane S as going away from the first flow path 15, the chips may tend to be discharged in a direction away from the cutting edge 11 by the coolant ejected from the first outflow port 25, thereby further enhancing chip discharge performance.

The extending direction of the fourth flow path 21 is not particularly limited to a specific direction. For example, the fourth flow path 21 may be extended in parallel to the imaginary plane S. The fourth flow path 21 may be extended along the imaginary plane S as in the fourth flow path 21 in a non-limiting embodiment illustrated in FIG. 8.

The coolant passing through the fourth flow path 21 may be ejected from the second outflow port 27 toward the cutting edge 11. If the fourth flow path 21 is extended in parallel to the imaginary plane S, a length from the second outflow port 27 to the cutting edge 11 becomes smaller. Accordingly, the coolant ejected from the second outflow port 27 can be efficiently applied to the cutting edge 11. This may lead to more efficient cooling of the cutting edge 11.

Figure 6:
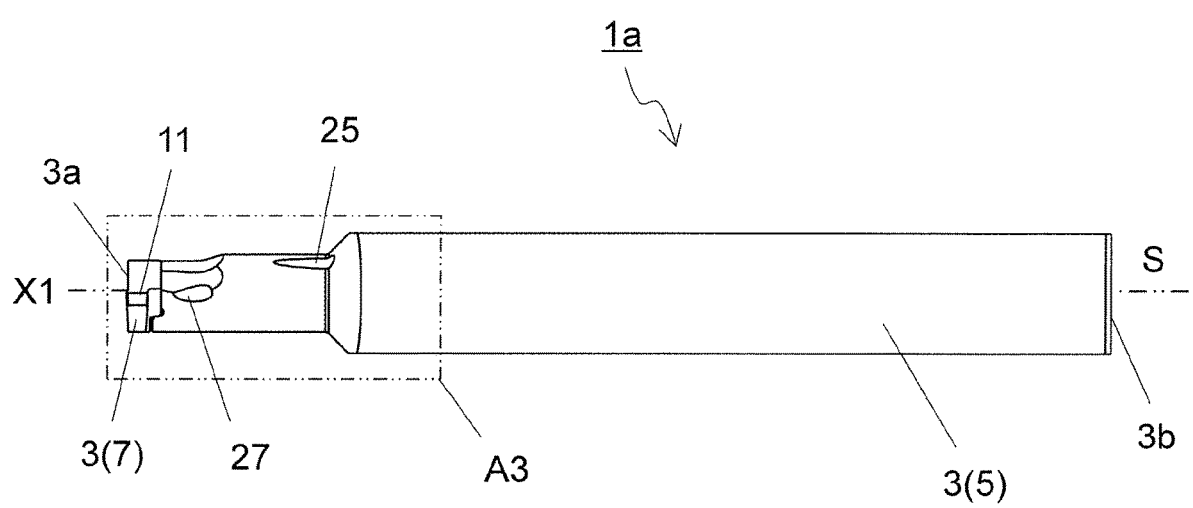
FIG. 6 is a side view of the cutting tool illustrated in FIG. 5 as viewed from a B1 direction.

Alternatively, the second outflow port 27 may be located closer to a side of the first end 3a than the first outflow port 25 as in a non-limiting embodiment illustrated in FIGS. 6 to 8. If the second outflow port 27 is relatively located on the side of the first end 3a, a length from the second outflow port 27 to the cutting edge 11 can be made smaller. Hence, the coolant ejected from the second outflow port 27 can be efficiently applied to the cutting edge 11 as described above.

If the first outflow port 25 is relatively located on a side of the second end 3b, the coolant ejected from the first outflow port 25 may tend to be dispersed over a wide range. This may facilitate stable discharge of the chips generated by the cutting edge 11.

An angle formed by the fourth flow path 21 and the central axis X1 (hereinafter referred to as a second inclination angle $\theta 2$) may be larger than an angle formed by the third flow path 19 and the central axis X1 (hereinafter referred to as a first inclination angle $\theta 1$) as in a non-limiting embodiment illustrated in FIG. 11.

If the second inclination angle $\theta 2$ is relatively large, the length from the second outflow port 27 to the cutting edge 11 can be further reduced while facilitating the ejection of the coolant from the second outflow port 27 toward the cutting edge 11. If the first inclination angle $\theta 1$ is relatively small, it is possible to reduce fluid pressure loss when the coolant flows from the first flow path 15 to the third flow path 19. Consequently, the chips may tend to be discharged more stably by the coolant ejected from the second outflow port 27.

The cutting tool 1a for inner diameter machining is not limited to a cutting tool for the internal grooving process. Examples of the cutting tool for the inner diameter machining may include boring bites. A boring bite for inner diameter machining may be illustrated and described below as the cutting tool 1b in a non-limiting embodiment.

The cutting tool 1b in a non-limiting embodiment may be described below with reference to FIGS. 12 to 17. FIGS. 12 to 17 may be drawings respectively corresponding to FIGS. 6 to 11. The following description of the cutting tool 1b may be mainly focused on differences from the cutting tool 1a. Therefore, a detailed description of a configuration similar to that in the cutting tool 1a may be omitted in some cases.

Figure 12:
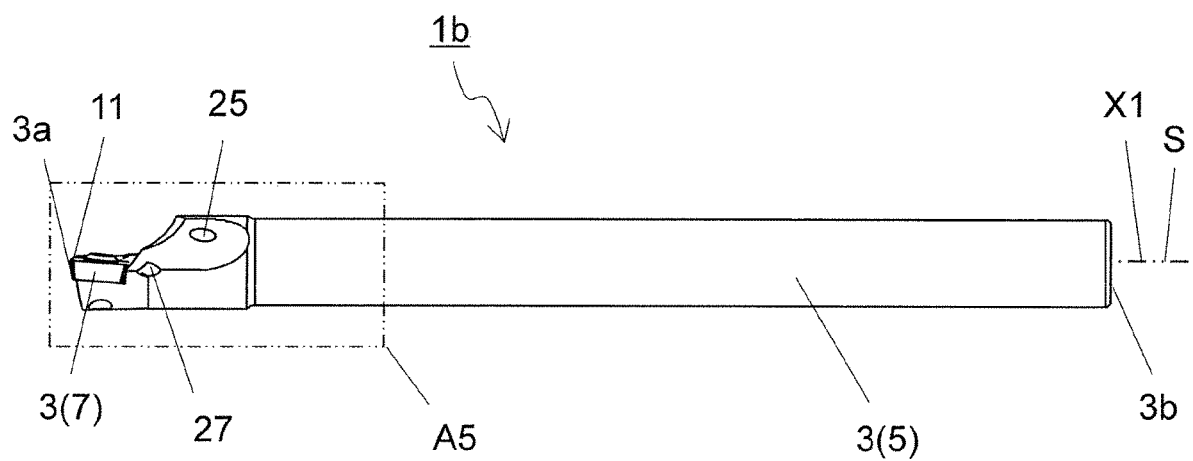
FIG. 12 is a side view illustrating a cutting tool in a non-limiting embodiment.
Figure 15:
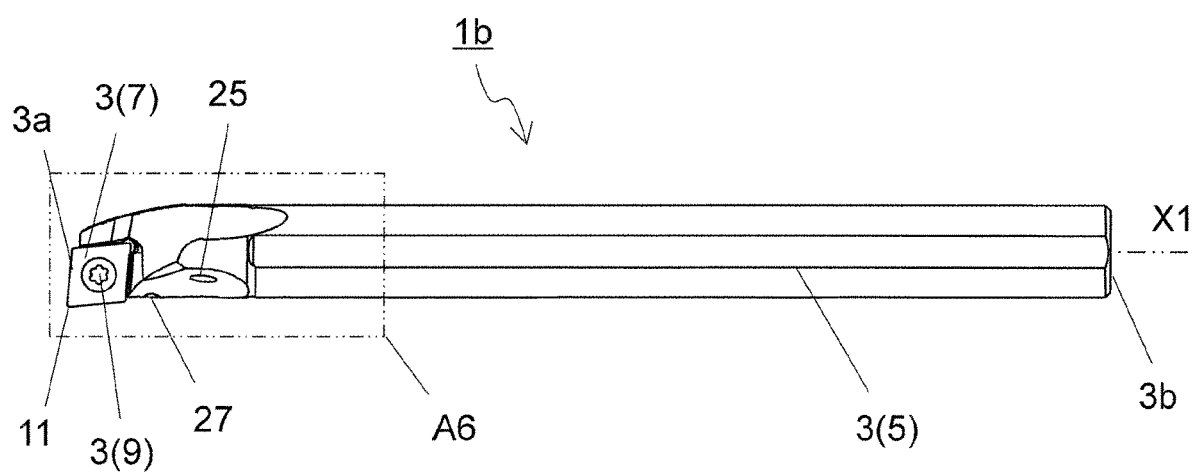
FIG. 15 is a side view of the cutting tool illustrated in FIG. 12 as viewed from a different direction.
Figure 16:
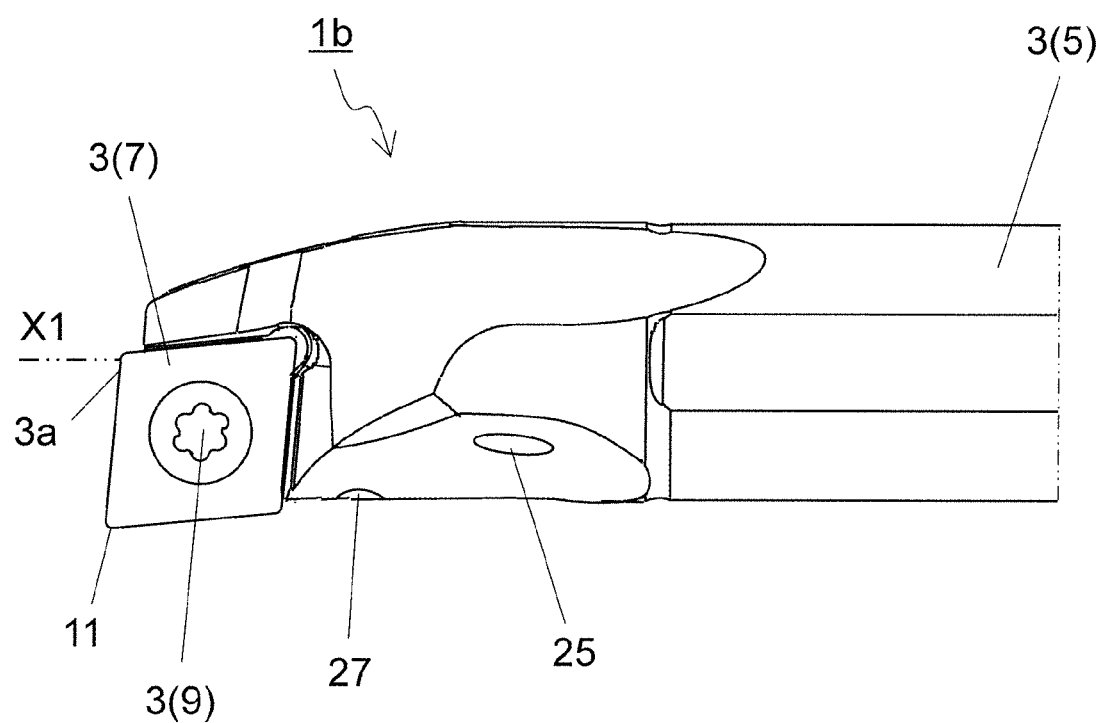
FIG. 16 is an enlarged view of a region A6 illustrated in FIG. 15.
Figure 17:
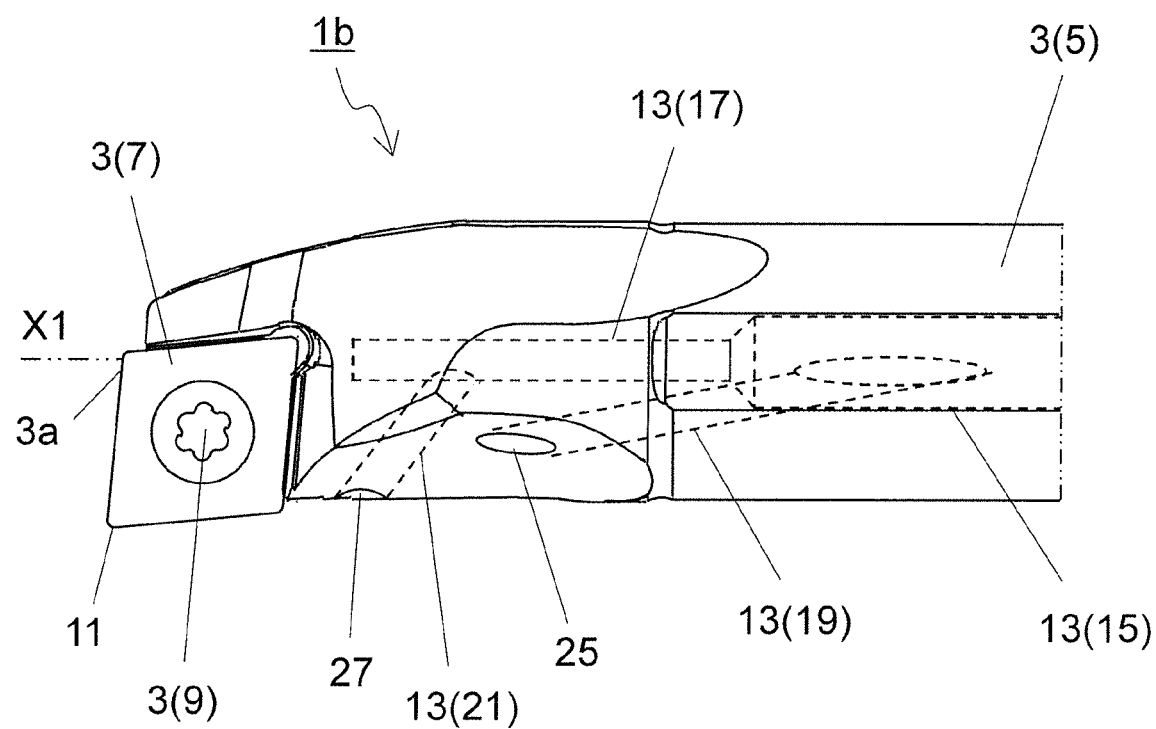
FIG. 17 is a perspective view of a flow path in the cutting tool illustrated in FIG. 16.

Similarly to the cutting tool 1a, the cutting tool 1b illustrated in FIGS. 12 and 15 may include a main body 3 having a bar shape extended along a central axis X1 from a first end 3a to a second end 3b. Similarly to the main body 3 illustrated in FIG. 6, the main body 3 in a non-limiting embodiment illustrated in FIG. 12 may be constituted by a holder 5, an insert 7 and a fixing member 9.

A pocket may be located on a side of the first end 3a in the holder 5. The holder 5 may include the pocket in a non-limiting embodiment illustrated in FIGS. 12 and 13. A concave part may be located on a side of the first end 3a in the holder 5, and the pocket may be constituted by the concave part in a non-limiting embodiment illustrated in FIGS. 12 and 13. The pocket may be a region in which the insert 7 is located.

The insert 7 may have the disc shape in a non-limiting embodiment illustrated in FIG. 2. The insert 7 may have a polygonal plate shape in a non-limiting embodiment illustrated in FIG. 13. Similarly to the insert 7 in a non-limiting embodiment illustrated in FIG. 13, the insert 7 in a non-limiting embodiment illustrated in FIG. 2 may include the through hole 7b. The through hole 7b and the screw hole may be extended in the direction along the central axis X1 in a non-limiting embodiment illustrated in FIG. 2. The through hole 7b and a screw hole may be extended in a direction orthogonal to the central axis X1 in the insert 7 in a non-limiting embodiment illustrated in FIG. 15.

Figure 13:
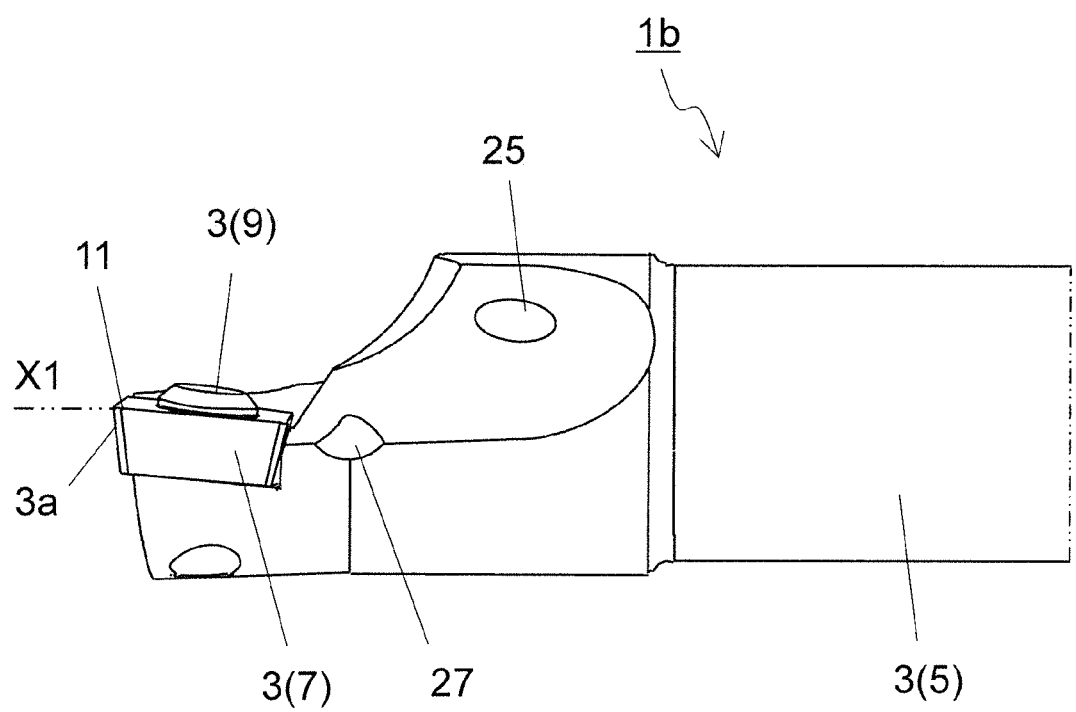
FIG. 13 is an enlarged view of a region A5 illustrated in FIG. 12.
Figure 14:
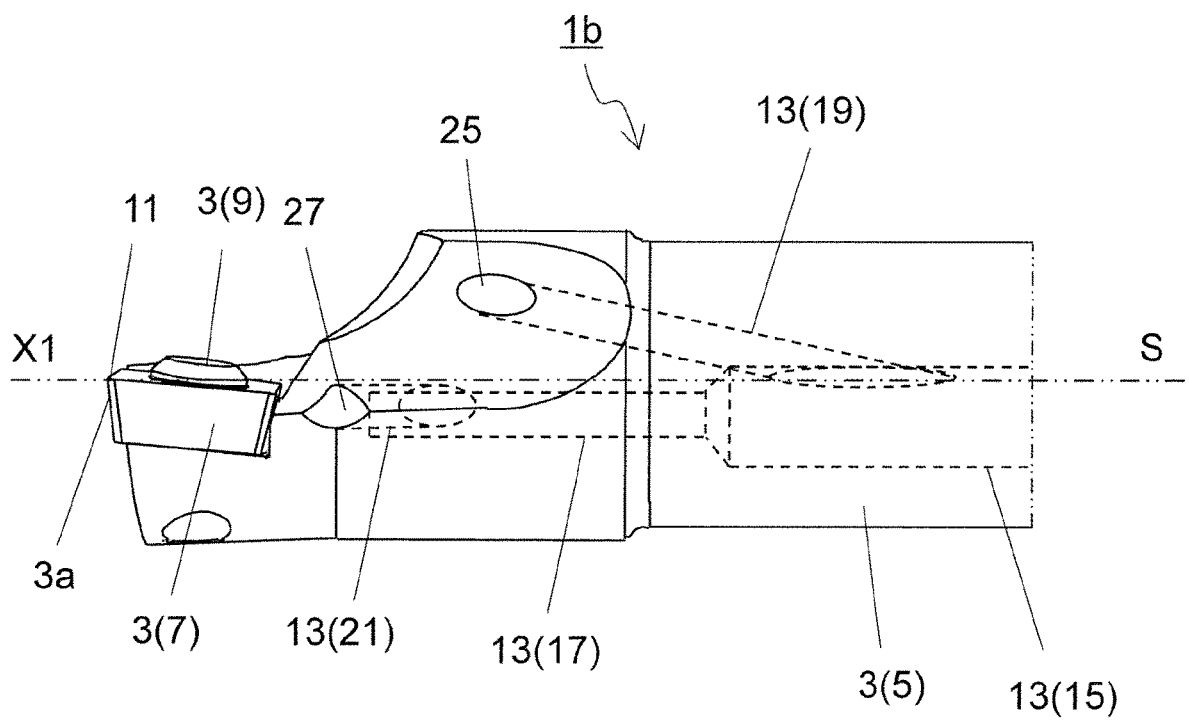
FIG. 14 is a perspective view of a flow path in the cutting tool illustrated in FIG. 13.

Similarly to the cutting tool 1a in a non-limiting embodiment illustrated in FIG. 7, the cutting tool 1b in a non-limiting embodiment illustrated in FIG. 13 may include, as a flow path 13, a first flow path 15, a second flow path 17, a third flow path 19 and a fourth flow path 21. As illustrated in FIGS. 13 and 14, a first outflow port 25 included in the third flow path 19 may be located more away from an imaginary plane S including the central axis X1 and a cutting edge 11 than a second outflow port 27 included in the fourth flow path 21. Hence also in the cutting tool 1b in a non-limiting embodiment illustrated in FIGS. 15 to 17, it is possible to efficiently cool the cutting edge 11 and suitably discharge chips.

Although a detailed description is omitted, the described configuration of the cutting tool 1a may be suitably applicable to the cutting tool 1b. For example, the third flow path 19 may be extended so as to go away from the imaginary plane S as going away from the first flow path 15, and the fourth flow path 21 may be extended in parallel to the imaginary plane S in the cutting tool 1b as illustrated in FIG. 14.

<Method for Manufacturing Machined Product>

Methods for manufacturing a machined product 103 in various embodiments of the present disclosure may be described in detail below. The cutting tool 1a may be used in a non-limiting embodiment illustrated in FIGS. 18 to 20, but it is not intended to limit to this embodiment. For example, the cutting tool 1b may be used.

The method for manufacturing the machined product 103 in a non-limiting embodiment may include the following steps (1) to (4).

Figure 18:
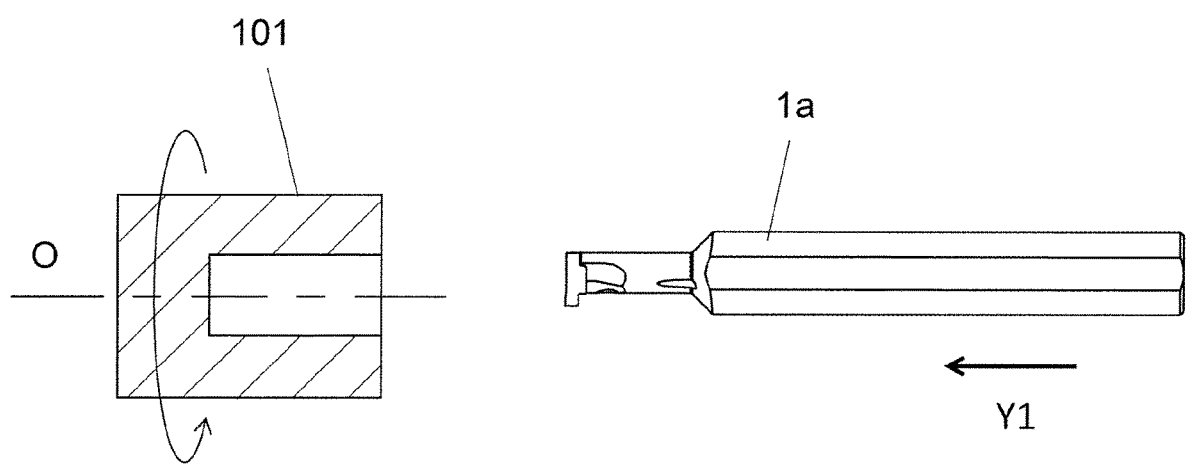
FIG. 18 is a schematic diagram illustrating one of the steps in a method for manufacturing a machined product in a non-limiting embodiment.
Figure 19:
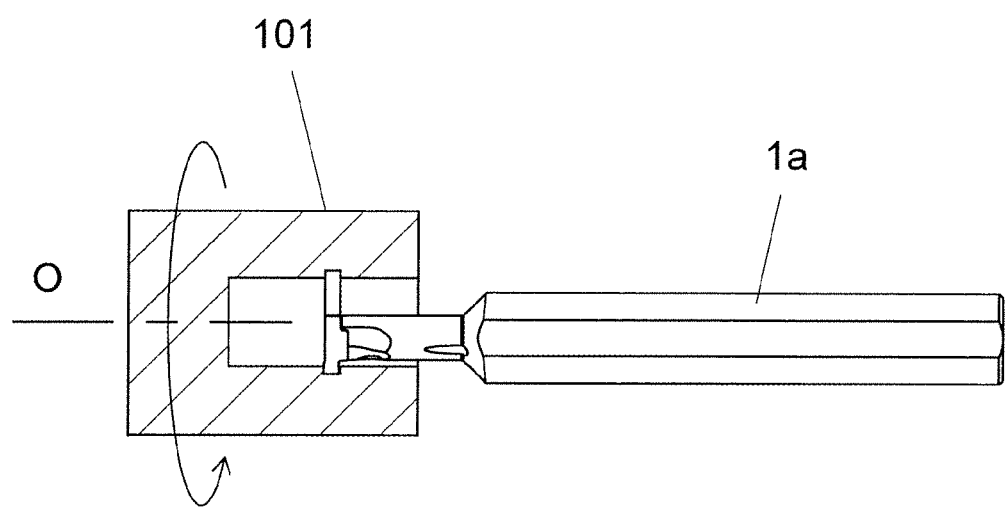
FIG. 19 is a schematic diagram illustrating one of the steps in the method for manufacturing a machined product in a non-limiting embodiment.
Figure 20:
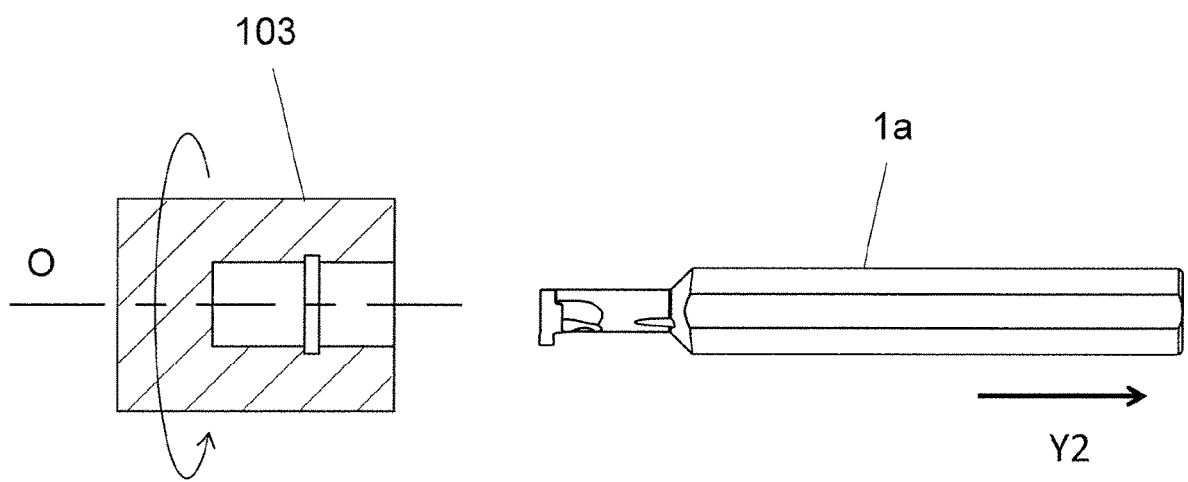
FIG. 20 is a schematic diagram illustrating one of the steps in the method for manufacturing a machined product in a non-limiting embodiment.

(1) preparing a workpiece 101 and the cutting tool 1a as illustrated in FIG. 18;
(2) rotating the workpiece 101;
(3) causing the workpiece 101 and the cutting tool 1a to come into contact with each other as illustrated in FIG. 19; and
(4) causing the workpiece 101 and the cutting tool 1a to separate from each other as illustrated in FIG. 20.

Specifically, examples of material of the workpiece 101 prepared in the step (1) may include carbon steel, alloy steel, stainless steel, cast iron and nonferrous metals. In the step (1), the cutting tool 1a may be prepared in a non-limiting embodiment illustrated in FIG. 18.

In the step (2), the workpiece 101 may be rotated on the basis of a rotation axis O thereof as illustrated in FIG. 18.

In the step (3), the cutting tool 1a may be relatively brought near the workpiece 101 being rotated by moving the cutting tool 1a in an arrowed direction Y1. Subsequently, the cutting tool 1a may be brought into contact with the workpiece 101 being rotated as illustrated in FIG. 19. The workpiece 101 may be cut out by bringing the cutting edge of the cutting tool 1a into contact with the workpiece 101 in a non-limiting embodiment illustrated in FIG. 19. The workpiece 101 may be cut out while causing coolant to flow out of the first outflow port and the second outflow port.

In the step (4), the cutting tool 1a may be kept far away from the workpiece 101 to obtain the machined product 103 by moving the cutting tool 1a in an arrowed direction Y2 as illustrated in FIG. 20.

With the method for manufacturing the machined product 103 in a non-limiting embodiment, the use of the cutting tool 1a makes it possible to efficiently cool the cutting edge and suitably discharge chips.

Alternatively, the workpiece 101 may be brought near the cutting tool 1a in the step (3). The workpiece 101 may be kept far away from the cutting tool 1a in the step (4). If it is desired to continue a cutting process, the step of bringing the cutting edge into contact with different portions of the workpiece 101 may be repeated while the workpiece 101 is kept rotating.

While the cutting tools 1 and the methods for manufacturing a machined product in a non-limiting embodiment of the present disclosure have been exemplified above, the present disclosure is not limited to the above embodiment. It is, of course, possible to make any arbitrary ones in so far as they do not depart from the gist of the present disclosure.

DESCRIPTION OF THE REFERENCE NUMERAL 1a, 1b cutting tool
3 main body
3a first end
3b second end
5 holder
7 insert
9 fixing member (screw)
11 cutting edge
13 flow path
15 first flow path
17 second flow path
19 third flow path
21 fourth flow path
23 inflow port
25 first outflow port
27 second outflow port
101 workpiece
103 machined product

The invention claimed is:

1. A cutting tool, comprising:
a main body having a bar shape extended along a central axis from a first end to a second end, wherein
the main body comprises
a cutting edge located so as to protrude sideward on a side of the first end,
a first flow path which is located along the central axis and comprises an inflow port,
a second flow path whose inner diameter is smaller than that of the first flow path, the second flow path being located from the first flow path toward the first end along the central axis,
a third flow path connecting to the first flow path and comprising a first outflow port, and
a fourth flow path connecting to the second flow path and comprising a second outflow port,
the first outflow port is located further away from an imaginary plane comprising the central axis and the cutting edge than the second outflow port, and
a part of the second outflow port is included in the imaginary plane.

2. The cutting tool according to claim 1, wherein the third flow path is located further away from the imaginary plane than the fourth flow path.

3. The cutting tool according to claim 1, wherein the second outflow port opens toward the cutting edge.

4. The cutting tool according to claim 1, wherein the third flow path is extended so as to go away from the imaginary plane as going away from the first flow path.

5. The cutting tool according to claim 1, wherein the fourth flow path is parallel to the imaginary plane.

6. The cutting tool according to claim 1, wherein the second outflow port is closer to the first end than the first outflow port.

7. The cutting tool according claim 6, wherein an angle formed by the fourth flow path and the central axis is larger than an angle formed by the third flow path and the central axis.

8. The cutting tool according to claim 1, wherein the second outflow port is located further away from the central axis than the first outflow port in a front view from a direction orthogonal to the imaginary plane.

9. The cutting tool according to claim 1, wherein an inner diameter of the fourth flow path is smaller than an inner diameter of the second flow path.

10. A method for manufacturing a machined product, comprising:
rotating a workpiece;
bringing the cutting tool according to claim 1 into contact with the workpiece being rotated; and
moving the cutting tool away from the workpiece.

11. A cutting tool, comprising:
a main body comprising:
a first part having a bar shape extended along a central axis from a first end to a second end; and a second part extending from the first end of the first part in a direction perpendicular to the central axis and comprising a cutting edge parallel to the central axis; wherein the first part comprises
- a first flow path which is located along the central axis, comprises an inflow port, and has a first inner diameter,
- a second flow path which is located from the first flow path toward the first end along the central axis, and has a second inner diameter,
- a third flow path connecting to the first flow path and comprising a first outflow port, and
- a fourth flow path connecting to the second flow path and comprising a second outflow port, the second inner diameter is smaller than the first inner diameter, an imaginary plane including the central axis and the cutting edge is a standard plane, and the first outflow port is located further away from the standard plane than the second outflow port.

12. A cutting tool, comprising:
a main body having a bar shape extended along a central axis from a first end to a second end, wherein the main body comprises
- a cutting edge located so as to protrude sideward on a side of the first end,
- a first flow path which is located along the central axis and comprises an inflow port,
- a second flow path whose inner diameter is smaller than that of the first flow path, the second flow path being located from the first flow path toward the first end along the central axis,
- a third flow path connecting to the first flow path and comprising a first outflow port, and
- a fourth flow path connecting to the second flow path and comprising a second outflow port, and the first outflow port is located further away from an imaginary plane comprising the central axis and the cutting edge than the second outflow port, and the second outflow port is located further away from the central axis than the first outflow port in a front view from a direction orthogonal to the imaginary plane.

* * * * *